United States Patent [19]

Sako et al.

[11] Patent Number: 4,636,331
[45] Date of Patent: Jan. 13, 1987

[54] POLYMERIC COMPOSITE HEATING ELEMENT

[75] Inventors: Junichi Sako, Osaka; Toshiharu Yagi, Hyogo, both of Japan

[73] Assignee: Daikin Industries, Ltd., Osaka, Japan

[21] Appl. No.: 753,564

[22] Filed: Jul. 10, 1985

[30] Foreign Application Priority Data

Jul. 10, 1984 [JP] Japan ................................ 59-143688

[51] Int. Cl.$^4$ ............................................. H10B 1/06
[52] U.S. Cl. .................................... 252/511; 526/343
[58] Field of Search ........................................ 252/511

[56] References Cited

U.S. PATENT DOCUMENTS 3,654,187 4/1972 Takenska et al. .................. 252/518
4,547,311 10/1985 Sako et al. ........................... 252/511

*Primary Examiner*—Jacob Ziegler
*Attorney, Agent, or Firm*—Wenderoth, Lind & Ponack

[57] ABSTRACT

A polymeric composite heating element comprising a composition composed of a vinylidone fluoride-trifluoroethylene copolymer containing 30–85 mole % of vinylidene fluoride and 3–35% by weight based on the weight of the copolymer of electrically conductive carbon mixed in this copolymer.

3 Claims, 1 Drawing Figure

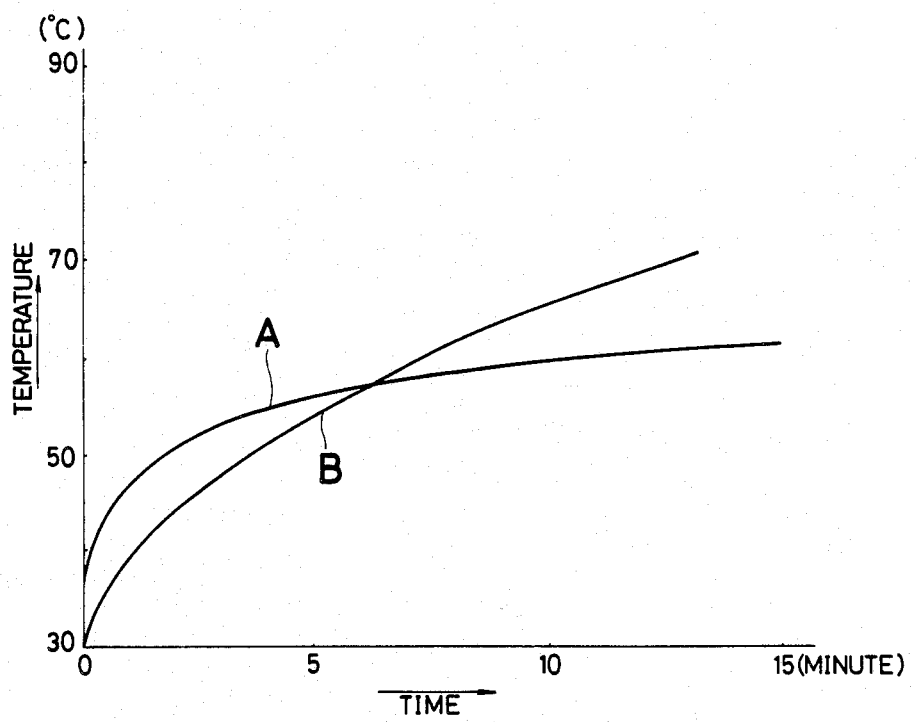

POLYMERIC COMPOSITE HEATING ELEMENT

BACKGROUND OF THE INVENTION

1. Field of the Invention

The present invention relates to a polymeric composite heating element, and more particularly, to a polymeric composite heating element of a quick heating type.

2. Description of the Prior Art

It has been known that by mixing electrically conductive carbon into a heat-resistant polymer an electric resistance heating element can be produced. Since the polymer is used as a matrix material in such electric resistance heating element, the element is excellent in workability, and can be wrought into a heating element in the form of a sheet, pipe, or the like. Thus, developments of various uses thereof have been made. For instance, for a heater in an electric carpet there is used such an electric resistance heating element as a composition comprising polytetrafluoroethylone (hereinafter referred to as "PTFE") and electrically conductive carbon dispersed in it. This electric resistance heating element accomplishes an extremely stable and reliable electrical carpet for its excellent characteristics such as heat-resistance of PTFE and the like, thus preventing any possible troubles.

However, the volume resistivity change of the conventional heating element is extremely small in a temperature range of between room temperature and 200° C. Accordingly, in the case where such heating element is used as a heater in the electric carpet and when power density of such heater is made large, the heater becomes hot quickly after electricity is charged. However, a hunting (oscillation range of the heater temperature at the time of controlling of switch) occurring at the time after a predetermined temperature is reached becomes large, thereby rendering the heater unsuitable for use in the electrical carpet. On the contrary, when the power density of the heater is made small, it is true that the hunting consequently becomes small, but it takes a long time for the carpet to be heated after the switch is turned on.

The quick warming type heating system is the best as the heating system for the electric carpet. The heating system of this type is one which is adapted such that a larger amount of current flows (when the system is initially rendered conductive so as to exhibit a quick heating feature), while during an ordinary operating period a smaller amount of current flows and the power density decreases thereby to reduce the hunting and hence the electric power to be consumed.

It is readily possible for the recent electronic technique to effect the aforementioned heating element of the quick heating type through the control by electric circuits. However, such heating element will be accompanied by the increase in production cost and the controlling space required. Therefore, such element is still unfavorably deficient. Accordingly, the heating element is the most preferable which exhibits a variable resistivity characteristic depending upon a temperature and whose resistance element has a quick heating feature.

SUMMARY OF THE INVENTION

The present inventors who made elaborate studies and researches in view of the above fact have found that the following polymeric composite heating element has the quick heating feature, exhibiting the positive temperature coefficient (PTC) of resistance characteristic:

A polymeric composite heating element which comprises a composite material of a vinylidene fluoride-trifluoroethylene copolymer (hereinafter referred to as "VDF-TrFE copolymer") and electrically conductive carbon mixed in this copolymer, or of a copolymer comprising the vinylidene fluoride, trifluoroethylene and at least one other copolymerizable component monomer, and the electrically conductive carbon mixed in this copolymer.

The present invention is based upon the above result obtained and acertained by experiments conducted by the present inventors. Accordingly an object of the invention is to provide a novel and improved heating element.

A further object of the invention is to provide a heating element which exhibits the positive temperature coefficient (PTC) of resistance characteristic and has the quick heating feature.

With a view to attaining the above objects, a polymeric composite heating element according to the present invention comprises a composition composed of a VDF-TrFE copolymer containing 30–85 mole % of vinylidene fluoride and 15–70 mole % of trifluoroethylene, and 3–35% by weight based on the weight of the copolymer of electrically conductive carbon mixed with this copolymer.

In a preferred embodiment, the weight of said electrically conductive carbon mixed in said VDF-TrFE copolymer is 5–20% by weight based on the weight of the copolymer.

In another preferred embodiment, said vinylidene fluoride-trifluoroethylene copolymer contains one or more further copolymerizable component monomers.

In still another preferred embodiment, said further copolymerizable component monomer is selected from the group consisting of vinyl fluoride, tetrafluoroethylene, chlorotrifluoroethylene, and hexafluoropropylene.

In yet another preferred embodiment, the quantity of said further component monomer is 0.5–15 mole % in said copolymer.

Consequently, the present invention relates to a heating element of a quick heating type wherein the reduction of hunting during the ordinary operating period is accomplished so as to decrease the consumption of the electric power, and the control of electric circuits which will lead to the high production cost is unnecessary.

BRIEF DESCRIPTION OF THE DRAWING

These and other objects, features and advantages of the invention will become more apparent upon a reading of the following detailed description and drawing.

FIGURE is a graph illustrating the characteristic of temperature rise with the lapse of time of the heating element of the present invention.

DETAILED DESCRIPTION OF THE PREFERRED EMBODIMENTS

Referring now to the FIGURE, there are described preferred embodimets of the invention.

VDF-TrFE copolymer which is used as matrix for the electrically conductive carbon according to the invention comprises vinylidene fluoride-trifluoroethylene copolymer containing 30–85 mole % of vinylidene fluoride and 15–70 mole % of trifluoroethylene, and further includes such copolymers which contain at least one copolymerizable monomer in addition to vinylidene fluoride and trifluoroethylene in an amount of 0.5-15 mole %. In these copolymers three component polymers, that is, terpolymers are preferable. The examples of such copolymerizable monomers are vinyl fluoride, tetrafluoroethylene, chlorotrifluoroethylene, and hexafluoropropylene.

For the electrically conductive carbon, there are preferred the oil furnace series or the acetylene series, or there may be employed the mixture of such an organic electrically conductive carbon and graphite, or of such organic electrically conductive carbon and carbonaceous fiber. The ratio of the electrically conductive carbon mixed with the VDF-TrFE copolymer is 3-35% by weight, preferably 5-20% by weight, of the copolymer employed. The use of such a carbonaceous material below 3% by weight tends to deteriorate the electrical conductivity of the heating element, while the use of above 35% by weight reduces the moldability of the composition of the above two components to make the heating element. The heating element according to the invention can be wrought into a form of a film, pipe, or rod. Among them, the heating element in the form of a film is preferable. The polymeric composite heating element having a composition comprising VDF-TrFE copolymer and electrically conductive carbon may be utilized for a heater material as such, or this element may be laminated with ordinary available plastics film, such as that of polyester, polypropylene, or the like to improve its material strength. In the latter case, it is desired to conduct surface treatment for the element or the plastics film by means of the known methods, such as corona discharge or plasma treatment, to improve the adhesion strength between the two components.

With the shape of the heating element unchanged, the power density q per unit area of the heating element can be estimated from the value of the volume resistivity $\rho v$ of the heating element. Then it is possible to evaluate the efficiency of the heating element by the value of the volume resistivity $\rho v$. Namely, the value of resistance R of the heating element is determined by the volume resistivity $\rho v$ according to the following equation (1):

$$R = \rho v \frac{l}{w \cdot d} \quad (1)$$

Where l is the distance between electrodes (cm), w is the width (cm) of the element, and d is the thickness (cm) thereof.

The power P (W) of the heating element is determined by the following equation (2) when voltage E is applied:

$$P = \frac{E^2}{R} = \frac{E^2 w \cdot d}{\rho v l} \quad (2)$$

Based upon the equation (2) the power density q (w/cm$^2$) per unit area is expressed by the following equation (3):

$$q = \frac{P}{w \cdot l} \quad (3)$$

The present invention will be explained in more detail by the following examples.

EXAMPLES 1-6

10 wt. parts of VDF-TrFE copolymers having various VDF contents as shown in Table 1 and 1.1 wt. parts of electrically conductive carbon (manufactured by Columbia Carbon Co., Ltd. as #950) were added in 100 wt. parts of methylethylketone (MEK), and the mixture was shaken in a shaker for 90 minutes with 100 wt. parts of glass beads with the particle diameter of 3-5 mm. Then, the glass beads were separated from the mixture. Thus obtained compositions were cast on glass plates and dried on the plates, then heated at a temperature of about 260° C. under pressure in an electric furnace to obtain polymeric composite heating elements in the form of thin films. The volume resistivity $\rho v$ of the so prepared polymeric composite heating elements at 30° C. and 100° C. were determined, and the ratio (K) of the volume resistivity $\rho v$ at 100° C. to that at 30° C. was also calculated. Thus, the volume resistivity $\rho v$ of the heating element at 30° C. and the ratio (K) are shown in Table 1.

TABLE 1

| Example No. | Content of VDF (mole %) | Volume Resistivity $\rho v$ (Ω-cm) | K |
| --- | --- | --- | --- |
| 1 | 30 | 8.0 | 1.52 |
| 2 | 48 | 7.1 | 1.58 |
| 3 | 52 | 6.3 | 2.00 |
| 4 | 58 | 5.5 | 1.86 |
| 5 | 65 | 5.0 | 1.60 |
| 6 | 73 | 5.4 | 1.65 |

REFERENCE EXAMPLES 1-3

A homopolymer of trifluoroethylene (PTrFE), a VDF-TrFE copolymer containing 13 mole % of vinylidene fluoride and 87 mole % of trifluoroethylene, and a homopolymer of VDF (PVDF) as shown in Reference Examples 1-3 in Table 2 were respectively dispersed in 100 wt. parts of MEK together with 1.1 wt. parts of the same electrically conductive carbon as used in Examples 1-6. Then these mixtures were likewise shaken in the shaker for 90 minutes with 100 wt. parts of glass beads with the particle diameter of 3-5 mm, respectively. Next, the glass beads were separated from the mixtures. Thus obtained compositions were cast on glass plates and dried on the plates, then heated at a temperature of about 260° C. under pressure in the electric furnace so as to obtain polymeric composite heating elements in the form of thin films. The volume resistivity $\rho v$ of the so prepared polymeric composite heating elements at 30° C. and 100° C. were determined and the ratio (K) of the volume resistivity $\rho v$ at 100° C. to that at 30° C. for each case was calculated. Thus, the volume resistivity $\rho v$ of these heating elements at 30° C. and the ratio (K) are shown in Table 2.

TABLE 2

| Reference Examples | Heating Elements | Volume Resistivity $\rho v$ (Ω-cm) | K |
| --- | --- | --- | --- |
| 1 | PTrFE | 7.6 | 1.18 |
| 2 | VDF (13%) | 8.9 | 1.30 |
| 3 | PVDF | 3.0 | 1.00 |

As apparent from Tables 1 and 2, the value of volume resistivity $\rho v$ in case of using the VDF-TrFE copolymer containing 30-85 mole % of vinylidene fluoride as matrix material increases remarkably with the rise of temperature as compared with PTrFE or PVDF or the copolymer with lower vinylidene fluoride content, which means that the material of the present invention exhibits the positive temperature coefficient (PTC) characteristic of resistance. Additionally, the difference between the volume resistivity $\rho v$ at 30° C. and one at 100° C. is substantially large in case of the present invention.

EXAMPLES 7-9

In the same manner as in Example 1-6 but employing as matrix the terpolymers of VDF, TrFE and hexafluoropropylene (HFP) having monomer compositions shown in Table 3, the value K which is the ratio of volume resistivity $\rho v$ at 100° C. to that at 30° C. was measured. What is of note in these Examples is that the terpolymer has a composition of VDF and TrFE of 1 to 1. The preparation process of the polymeric composite heating elements shown in Table 3 is the same as that of Examples 1-6, and the method of the determination of the values of K is the same as that of Examples 1-6.

The results are shown in Table 3.

TABLE 3

| Example No. | VDF (mole %) | TrFE (mole %) | HFP (mole %) | K |
| --- | --- | --- | --- | --- |
| 7 | 47.5 | 47.5 | 5 | 2.10 |
| 8 | 46.5 | 46.5 | 7 | 2.60 |
| 9 | 45.0 | 45.0 | 10 | 1.70 |

As apparent from Table 3, the terpolymers in Examples 7-9 also exhibit the positive temperature coefficient characteristic of resistance and the difference between the volume resistivity $\rho v$ at room temperature (30° C.) and that at 100° C. is substantially large.

The characteristic of the temperature rise with the lapse of time was measured for the heater of Example 7 and the result is shown as line A in the FIGURE. For comparison as line B in the FIGURE is shown the characteristic of temperature rise of the heating element in the form of a sheet having a composition composed of a matrix of polytetrafluoroethylene (PTFE) and 30 wt % of the same electrically conductive carbon as used in the heating element in Example 7 uniformly impregnated in this matrix. The measurements of the former and latter heating elements were made under equal conditions as follows; each heating element in the form of a sheet of the size of 10×10 cm and thickness of 30 $\mu$m was sandwiched between polyester films with the thickness of 50 $\mu$m and the thus laminated heating element was mounted on a PTFE board of the size of 20×20 cm and the thickness of 5 mm. On the laminated heating element was not a chromel-alumel thermocouple for temperature measurement and further the thermocouple was covered for heat insulation with ten sheets of PTFE paper ("Polyflon Paper" manufactured by Daikin Industries, Ltd.) of 500 $\mu$m.

As apparent from the FIGURE, the heating element comprising VDF-TrFE copolymer series having the positive temperature coefficient (PTC) characteristic of resistance exhibits the sharp rise in temperature as compared with the heating element comprising PTFE polymer which has no such positive temperature coefficient (PTC) characteristic of resistance.

EXAMPLES 10 AND 11

Employing two kinds of copolymers, the measurements of the value K were conducted. Each of the employed copolymers is a terpolymer which contains VDF and TrFE in the same amount and the third comonomer which is HFP in an amount of 5 mole % in case of Example 10 and perfluorovinylether (PFVE) in an amount of 1 mole % in case of Example 11. The other conditions in the method of measurements are the same as those of Examples 1-6.

The results are shown in Table 4.

TABLE 4

| Example No. | Copolymerized Monomer | Content of Copolymerized Monomer (mole %) | K |
| --- | --- | --- | --- |
| 10 | HFP | 5 | 2.05 |
| 11 | FVE | 1 | 1.80 |

As apparent from Table 4, the positive temperature coefficient (PTC) characteristic of resistance of each of the heating elements in Examples 10 and 11 is observed. The characteristic was hardly deteriorated even when the element comprises the heating element having both sides thereof laminated with the polyester film.

EXAMPLES 12 TO 16

In the same manner as in Examples 1-6 but using VDF-TrFE copolymer of the VDF content of 52 mole % as matrix material and varying the content of electrically conductive carbon as shown in Table 5, the measurements of the value K were conducted.

The result are shown in Table 5.

TABLE 5

| Example No. | Content of Carbon (wt %) | K |
| --- | --- | --- |
| 12 | 5 | 1.60 |
| 13 | 8 | 1.90 |
| 14 | 15 | 1.65 |
| 15 | 20 | 1.45 |
| 16 | 30 | 1.25 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A polymeric composite heating element comprising a composition containing (1) a copolymer of 30–85 mole % of vinylidene fluoride, 15–70 mole % of trifluoroethylene and 0.5–15 mole % of a further copolymerizable monomer selected from the group consisting of vinyl fluoride, tetrafluoroethylene, chlorotrifluoroethylene and hexafluoropropylene, and (2) 3–35% by weight of electrically conductive carbon based on the weight of said copolymer.

2. A polymeric composite heating element as claimed in claim 1, wherein the amount of said electrically conductive carbon is 5–20, % by weight based on the weight of the copolymer.

3. A polymeric composite heating element as claimed in claim 1, wherein the form of the polymeric composite heating element is a film.

* * * * *